(12) United States Patent
Hansen

(10) Patent No.: US 12,260,968 B2
(45) Date of Patent: Mar. 25, 2025

(54) ELECTRICALLY CONDUCTIVE COMPOSITE WITH CO-CURED REGION FOR INTERFACE SURFACES

(71) Applicant: CONDUCTIVE COMPOSITES COMPANY IP, LLC, Heber City, UT (US)

(72) Inventor: Nathan D. Hansen, Fairfax, VA (US)

( * ) Notice: Subject to any disclaimer, the term of this patent is extended or adjusted under 35 U.S.C. 154(b) by 243 days.

(21) Appl. No.: 17/990,648

(22) Filed: Nov. 18, 2022

(65) Prior Publication Data
US 2023/0162881 A1 May 25, 2023

Related U.S. Application Data

(60) Provisional application No. 63/283,281, filed on Nov. 25, 2021.

(51) Int. Cl.
| | |
|---|---|
| *H01B 1/02* | (2006.01) |
| *B32B 3/08* | (2006.01) |
| *B32B 5/02* | (2006.01) |
| *B32B 15/02* | (2006.01) |
| *B32B 15/14* | (2006.01) |
| *B32B 15/20* | (2006.01) |

(52) U.S. Cl.
CPC .............. *H01B 1/02* (2013.01); *B32B 3/08* (2013.01); *B32B 15/02* (2013.01); *B32B 15/20* (2013.01); *B32B 5/02* (2013.01); *B32B 15/14* (2013.01); *B32B 2255/02* (2013.01); *B32B 2255/205* (2013.01); *B32B 2260/021* (2013.01); *B32B 2260/046* (2013.01); *B32B 2262/106* (2013.01); *B32B 2307/202* (2013.01); *B32B 2581/00* (2013.01)

(58) Field of Classification Search
None
See application file for complete search history.

(56) References Cited

U.S. PATENT DOCUMENTS

| | | | |
|---|---|---|---|
| 2012/0040578 A1* | 2/2012 | Anjema | B29C 44/1209 442/181 |
| 2012/0301681 A1* | 11/2012 | Sevilla | B29C 70/386 428/179 |
| 2020/0307162 A1* | 10/2020 | Remy | B32B 15/08 |

* cited by examiner

*Primary Examiner* — John Vincent Lawler
(74) *Attorney, Agent, or Firm* — Craig J. Madson; Madson IP, P.C.

(57) ABSTRACT

A conductive composite structure has a conductive interface surface that enhances conductivity and provides corrosion protection by co-curing a metal-mesh gasket adjacent to a metal wire mesh layer in a multi-layer laminate structure. By co-curing metal-mesh gasket and metal wire mesh layers, gasket tear off and non-conductive resin face issues are eliminated. The conductive interface surface may be ablated to expose at least a portion of the metal-mesh gasket and create potential wire-to-wire contact points when complementary interface surfaces are brought together to create a highly conductive contact interface that eliminates or reduces electromagnetic shielding leakage within the conductive interface region.

17 Claims, 5 Drawing Sheets

ELECTRICALLY CONDUCTIVE COMPOSITE WITH CO-CURED REGION FOR INTERFACE SURFACES

RELATED APPLICATION

This patent application claims the benefit of U.S. Provisional Patent Application Ser. No. 63/283,281 that was filed on Nov. 25, 2021, for an invention titled ELECTRICALLY CONDUCTIVE COMPOSITE WITH CO-CURED REGION FOR INTERFACE SURFACES, which is hereby incorporated herein by this reference.

BACKGROUND OF THE INVENTION

1. Field of the Invention

The present invention relates to systems and methods for creating electrically conductive surfaces in multi-phase composite systems. More specifically, the present invention relates to systems and methods that provide a highly electrically conductive and corrosion-resistant surface for a multi-component composite.

2. The Relevant Technology

Current approaches to creating electrically conductive composite systems involve many approaches, primarily encompassing the incorporation of metals, fibers, and resins in various formats and combination methods to achieve desired properties that may include low density, high strength, high stiffness, and high electrical conductivity.

For example, current art has been developed to combine metal-coated carbon fiber composite products and metal meshes to construct lightweight composite laminates with good electromagnetic shielding properties. These laminates use very thin and light metallized carbon fiber scrims to impart structural integrity and higher frequency shielding properties in concert with highly open and porous metal meshes (primarily made of copper) which provide very high electrical conductivity and lower frequency shielding protection. These layers can also be jacketed between strong and stiff metal coated carbon fabric layers. This approach yields a lightweight, high strength structural material that provides electromagnetic shielding comparable with solid metal sheeting, at a fraction of the weight and with improved corrosion resistance.

To enhance the commercial viability of these lightweight composite laminates formed into component parts of a product having shielding properties, it is important that electrical contact at an interface between components (such as the electrical contact between an enclosure and its lid) have very low resistance. Heretofore, achieving commercial viability while maintaining the requisite electrical contact has proved elusive. Achieving this low resistance requires good physical contact between the most conductive components of the system; namely, the metal-mesh layers and metal-coated composite layers. All components must have good contact with each other because the electrical contact affects shielding performance at both high frequencies and low frequencies.

Additionally, the presence of resins in the system complicates the electrical contact issue because the resins do not conduct electricity well, nor do they provide shielding effectiveness.

Accordingly, a need exists for new systems and methods for creating electrically conductive surfaces in multi-phase composite systems that provide good physical contact so that the electrical contact at the interface between components has very low resistance. It also would be an advantage if such new systems and methods provided structurally robust components that are non-corrosive and may be streamlined into the normal manufacturing process. Such systems and methods are disclosed herein.

BRIEF SUMMARY OF THE INVENTION

The present invention has been developed in response to the present state of the art. In particular, the problems and needs exhibited in the art have not yet been fully solved by currently available conductive resins or dry gasketing approaches.

The invention of the present disclosure is a new approach that addresses previously unmet needs in the industry by co-curing a highly conductive, metal-braided (or metal-knitted) gasket directly into a composite surface. This new approach resolves several issues: gasket tear off or vulnerability issues, non-conductive resin face issues, and the gasket may also be selected such that is provides superior corrosion resistance that will also protect any underlying metal layers. As a result, an electrically conductive surface in a multi-phase composite is created achieving better conductivity as the interface surfaces engage each other between component parts made of multi-phase composites. The issues of gasket tear off and electromagnetic shielding leakage within the interface region are eliminated or drastically reduced.

By selecting a highly conductive, metal-braided (or metal-knitted) gasket and infusing it with resin either before or after positioning the gasket to create an interface surface and then co-curing the gasket with the composite layup, the bonding of the gasket to the composite surface secures against tearing forces and metal contact points increase significantly between the gasket and the composite surface, as will be discussed below. The gasket also may be infused with the resin during layup, such as by a wet layup process or a resin infusion process. Further, the gasket may be pressed flat or nearly flat so that the area of contact with the composite surface is also increased significantly so that the co-curing increases the strength of the bond and eliminates the need for an adhesive (whether the adhesive is conductive or non-conductive) between the gasket and the composite surface.

These and other features of the present invention will become more fully apparent from the following description or may be learned by the practice of the invention as set forth hereinafter.

BRIEF DESCRIPTION OF THE SEVERAL VIEWS IN THE FIGURES

For the above-recited and other features and advantages of the invention to be readily understood, a more particular description of the invention briefly described above will be rendered by reference to specific embodiments thereof which are depicted or illustrated in the appended figures. Understanding that these depictions and drawings show only typical embodiments of the invention and should not be considered limiting of its scope, the invention will be described and explained with additional specificity and detail with reference to the accompanying figures in which.

Figure 6:
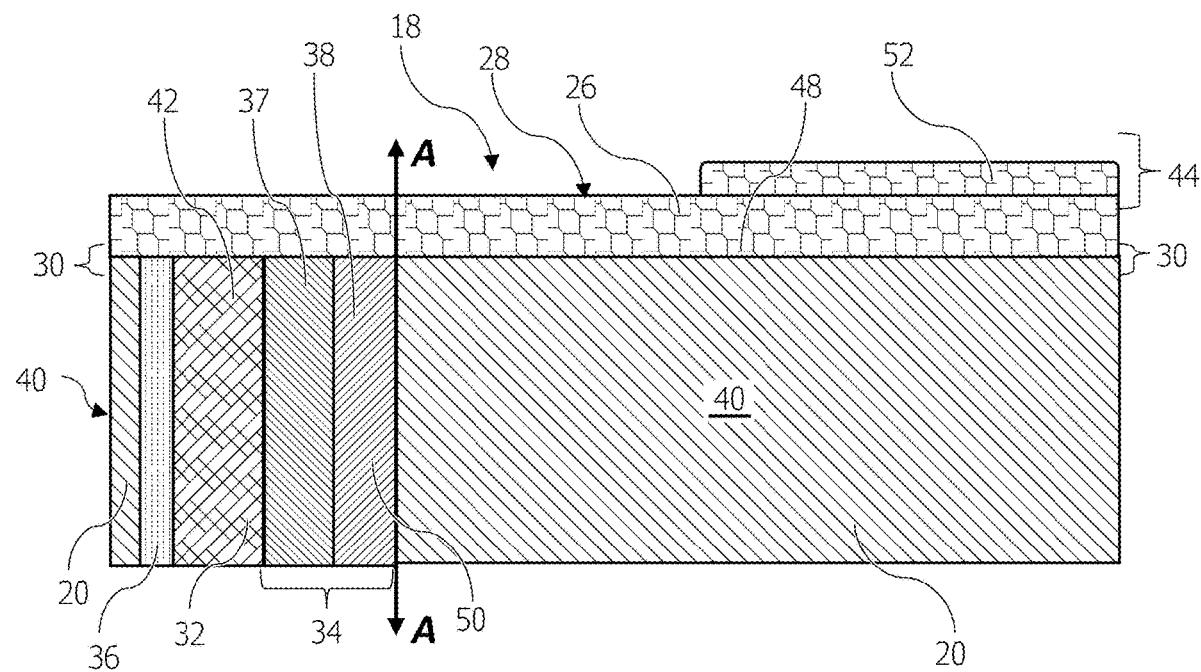

FIG. 6 is a side view of an upper portion of another exemplary conductive multi-component composite structure disposed vertically with the portion to the left of Arrow A cutaway on a diagonal section taper to reveal the layers of the multi-component composite, including a co-cured, compressed conductive gasket and an additional metal-mesh gasket attached to the co-cured, compressed conductive gasket by a suitable attachment.

Figure 7:
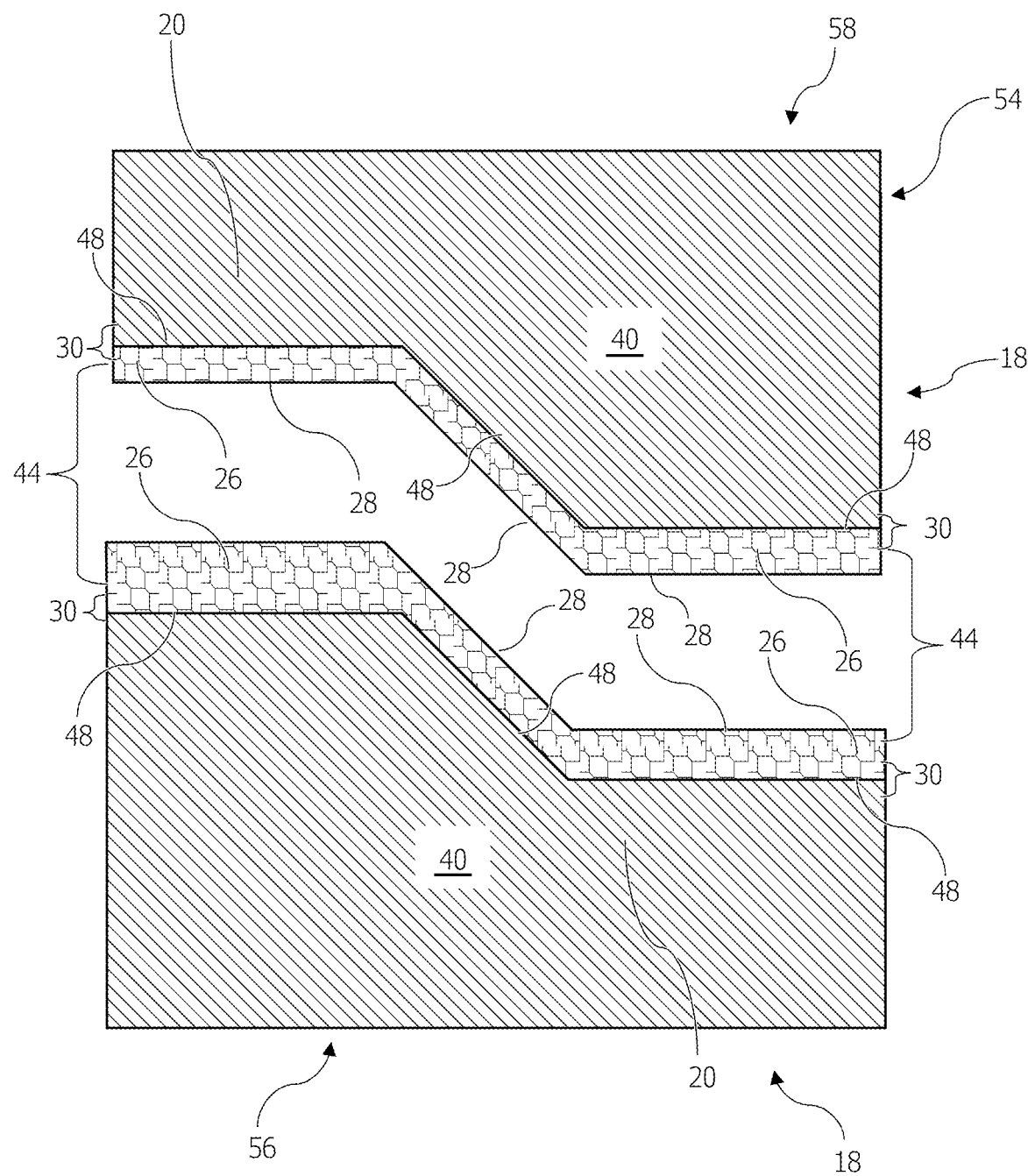

FIG. 7 is a side, exploded view of a portion of an exemplary interface region between an upper component and a lower component (such as a lid and an enclosure) showing an infused metal-mesh gasket co-cured on transverse faces of the upper and lower components of representative composite structures.

Figure 8:
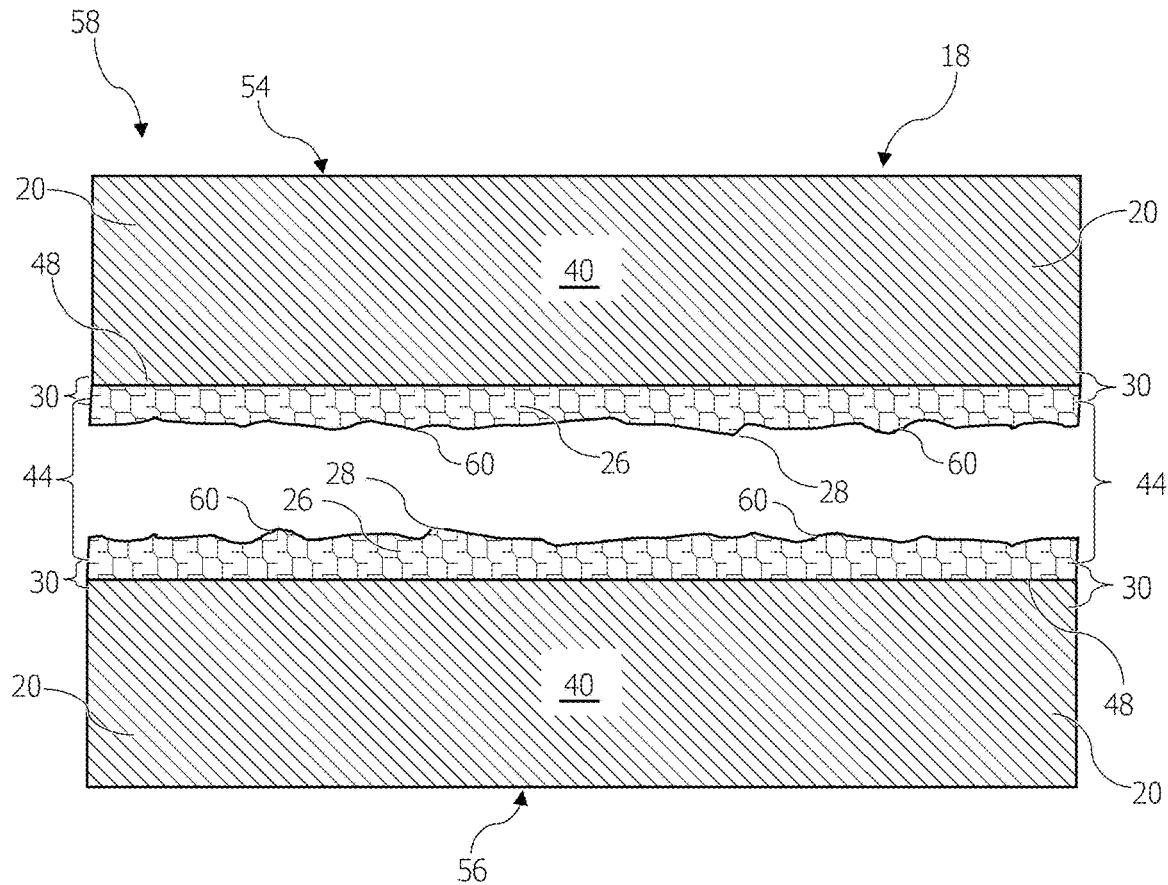

FIG. 8 is a sectional, exploded view of a portion of another exemplary interface region between an upper component and a lower component showing an ablated or roughed, infused metal-mesh gasket co-cured on each transverse face of the upper and lower components of representative composite structures disposed prior to or after the upper and lower components are brought into or out of abutting engagement.

Figure 9:
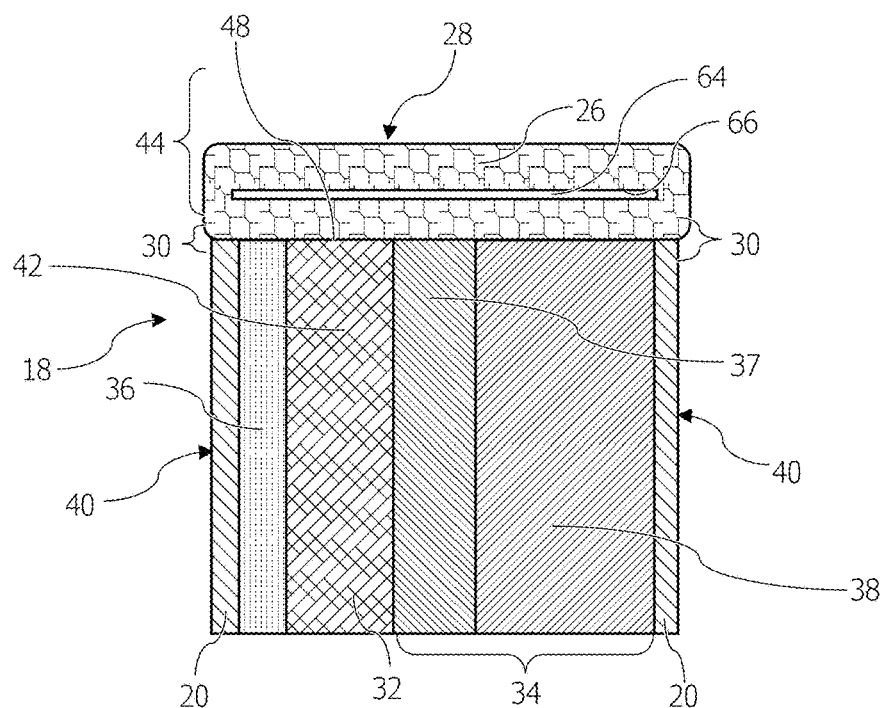

FIG. 9 is a sectional end view of an alternative exemplary conductive composite structure showing an exemplary combination of laminate layers disposed vertically, including a co-cured, conductive gasket layer where the co-cured, metal-mesh gasket is less than fully compressed, and a resilient resin is used in curing to give the interface surface a somewhat compressible, resilient surface.

REFERENCE NUMBERS

| | |
|---|---|
| metal-mesh gaskets 10 | dry metal-mesh gasket 12 |
| resin 14 | infused metal-mesh gaskets 16 |
| composite structure 18 | wall 20 |
| flange 22 | flange face 24 |
| (co-cured) infused metal gasket 26 | interface surface 28 |
| co-cured region 30 | copper wire mesh layer 32 |
| other layer(s) 34 | metal-coated carbon fiber composite layer 36 |
| lightweight conductive layer 37 | structural layer 38 |
| wall surface layer 40 | metal-wire mesh layer 42 |
| interface region 44 | stepped flange 46 |
| transverse edge 48 | light-weight structural layer 50 |
| additional metal-mesh gasket 52 | upper component 54 |
| lower component 56 | combination composite structure 58 |
| non-planar roughed surface 60 | (exposed) metal threads 62 |
| resilient resin 64 | internal void 66 |

DETAILED DESCRIPTION OF THE INVENTION

The presently preferred embodiments of the invention will be best understood by reference to the figures (photographic depictions and drawings), wherein like parts are designated by like numerals throughout. It will be readily understood that the aspects of the present invention, as generally described and illustrated in the figures herein, could be arranged and designed in a wide variety of different configurations. Thus, the following more detailed description of the embodiments of the present invention, as represented in the figures, is not intended to limit the scope of the invention, as claimed, but is merely representative of presently preferred embodiments of the invention.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Figure 1:
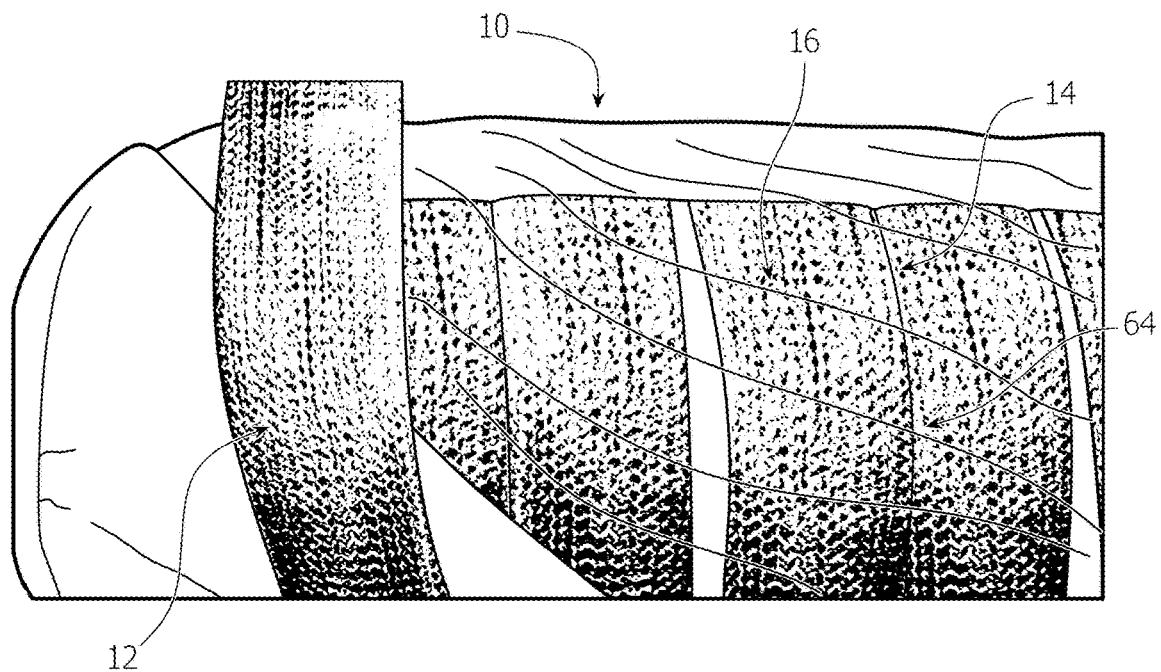
FIG. 1 is a photographic depiction of a plan view of exemplary metal-mesh gaskets, showing both a dry gasket and gaskets infused with resin.

FIG. 1 is a photographic depiction of exemplary metal-mesh gaskets 10. Depicted is an exemplary dry metal-mesh gasket 12 on the left side of the photograph. The remaining metal-mesh gaskets 10 shown are infused with a resin 14 to form exemplary infused metal-mesh gaskets 16. The term "metal-mesh gasket" is meant to include any type of metal-mesh gasket 10, including highly conductive, metal-braided (or metal-knitted) gaskets, as mentioned above. The type of metal used may be any metal that exhibits suitable conductivity for the gasket's intended purpose. Additionally, the metal used in the metal-mesh gaskets 10 may be selected from those metals that exhibit better corrosion resistance than, for example, copper or any other metal that is more susceptible to corrosion that may be included as a highly conductive, metal wire mesh layer in a composite structure. Resilient resin 64 is shown representatively in FIG. 1 but is discussed below in the discussion regarding FIG. 9.

Figure 2:
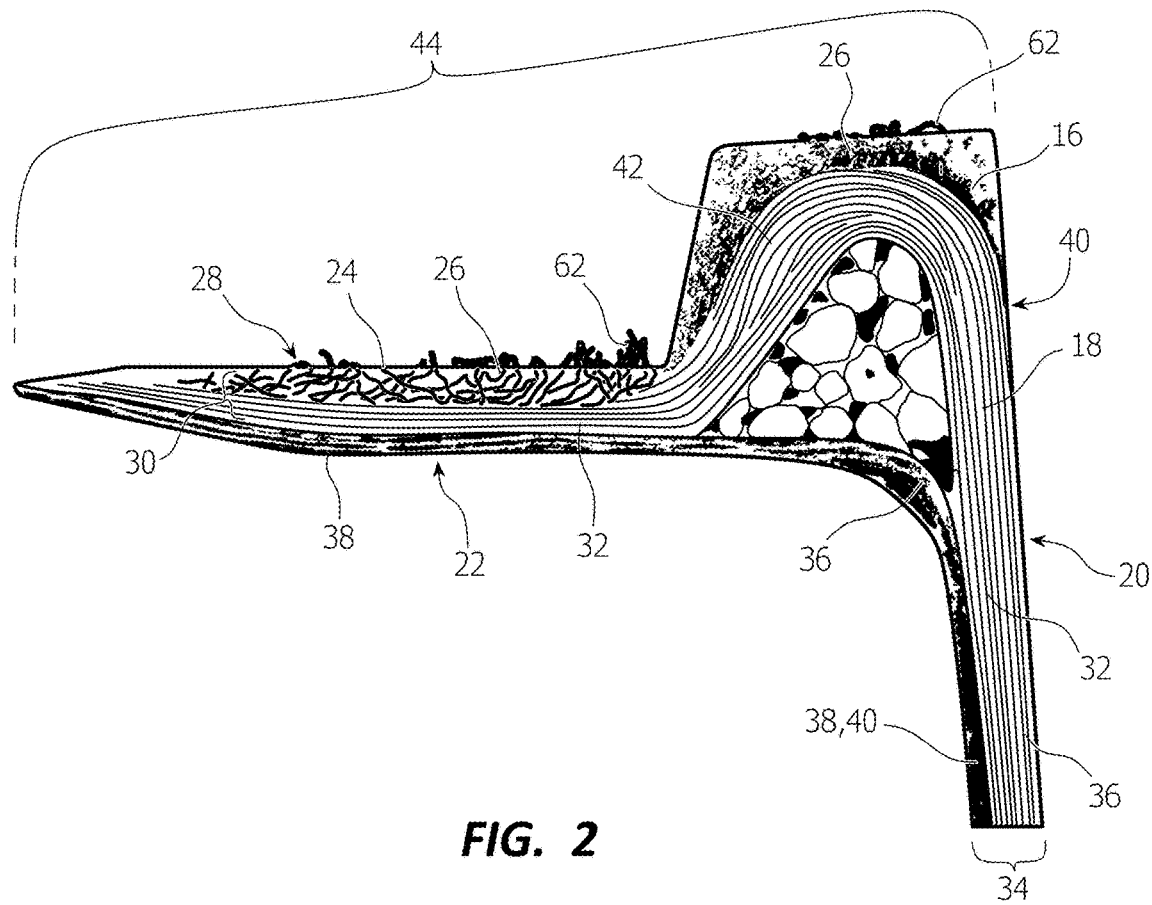
FIG. 2 is another photographic depiction of a vertical section of a multi-component composite structure having a substantially vertical wall and a substantially horizontal flange formed therein to define a flange face and comprising an infused metal gasket co-cured onto the flange face.

FIG. 2 is another photographic depiction. It is a vertical section of an exemplary, multi-component composite structure 18 having a substantially vertical wall 20 and a substantially horizontal flange 22 formed therein to define a flange face 24 and comprising an infused metal gasket 26 co-cured onto the flange face 24. Infused metal gasket 26 co-cured onto the flange face 24 has a conductive interface surface 28. The representative composite structure 18 depicted comprises a co-cured region 30, a copper wire mesh layer 32, and other layer(s) 34 such as a metal-coated carbon fiber composite layer 36, and a representative structural layer 38 that may or may not be a wall surface layer 40. Of course, the number of layers, the types of layers, the conductivity of the layers, the juxtaposition of various layers, and the various other composite variables and considerations may be altered and adjusted to create a composite structure 18 with various desired attributes to meet the desired needs for the composite structure 18. For example, the composite structure 18 depicted has a copper wire mesh layer 32, but other contemplated composite structures 18 may use a wire mesh comprising a metal other than copper, forming a metal-wire mesh layer 42 or may not have any metal-wire mesh layer 42.

Many types of composite structures are known, and desired composite attributes may be achieved by combining various layers with various characteristics. Heretofore the challenge of creating a robust, highly conductive interface region 44 with enhanced interface surface(s) 28 that protect(s) metal wire mesh layer(s) 32, 42 from corrosion has not been accomplished. However, by co-curing an infused metal-mesh gasket 16 with a composite layup, not only is the highly conductive interface surface 28 achieved, but manufacturing is streamlined by combining otherwise multiple steps into a single, simple co-curing manufacturing step that eliminates gasket tear off or vulnerability issues, non-conductive resin face issues, and electromagnetic shielding leakage from the interface region 44. Exposed metal threads 62 are depicted in FIG. 2 but are discussed below in reference to FIG. 8.

Figure 3:
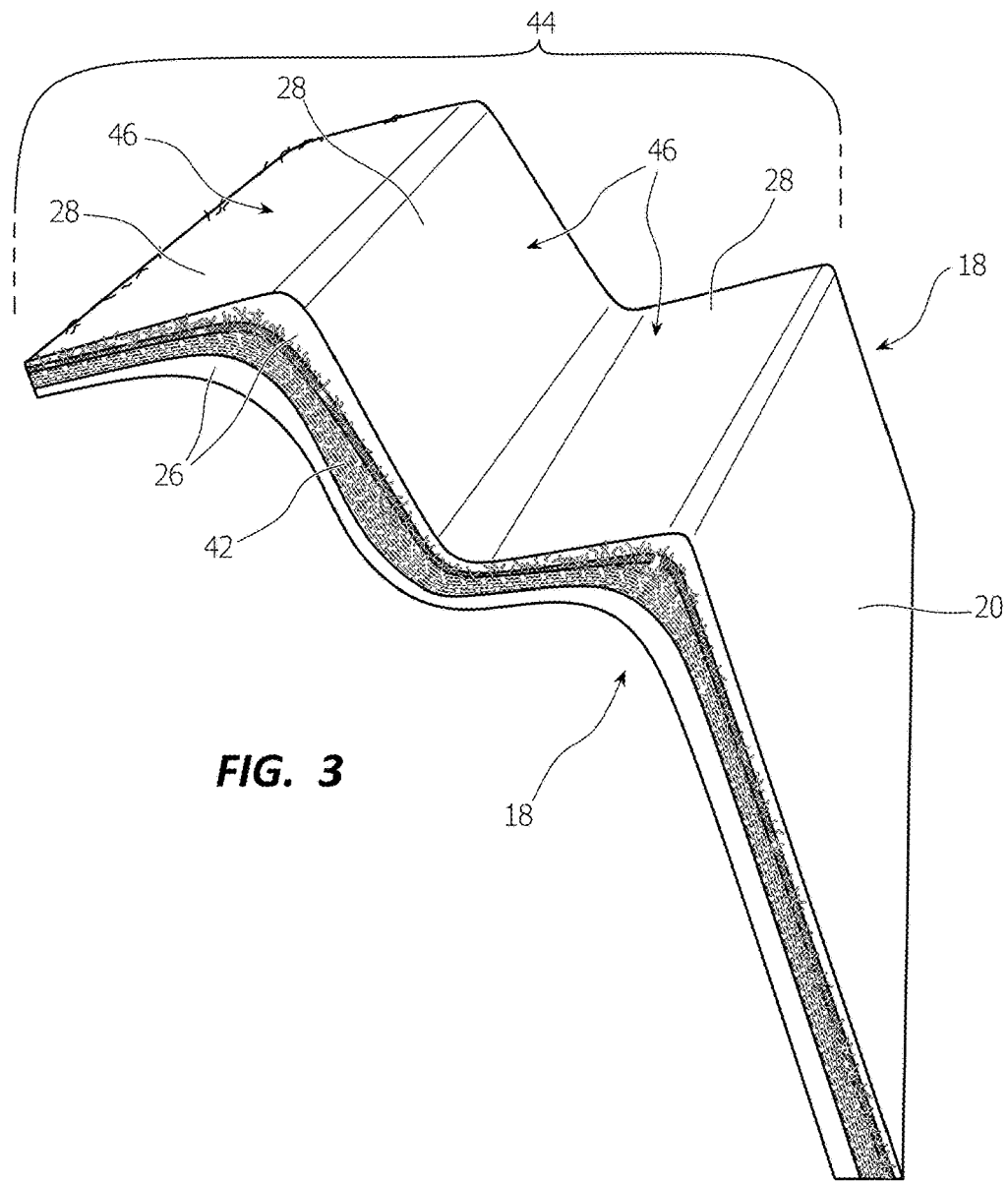
FIG. 3 is a perspective view of a vertical section of yet another multi-component composite structure and with a finished interface surface comprising a stepped flange with an infused metal gasket co-cured on the stepped flange.

FIG. 3 is a perspective view of a vertical section of yet another exemplary multi-component composite structure 18 having a finished interface surface 28 on a stepped flange 46 with an infused metal gasket 26 co-cured on the stepped flange 46. The composite structure 18 of FIG. 3 differs from the composite structure 18 of FIG. 2 in that it is trimmed and finished so that it depicts an interface surface 28 ready for abutting engagement with a complementary trimmed and finished interface surface 28.

Figure 4:
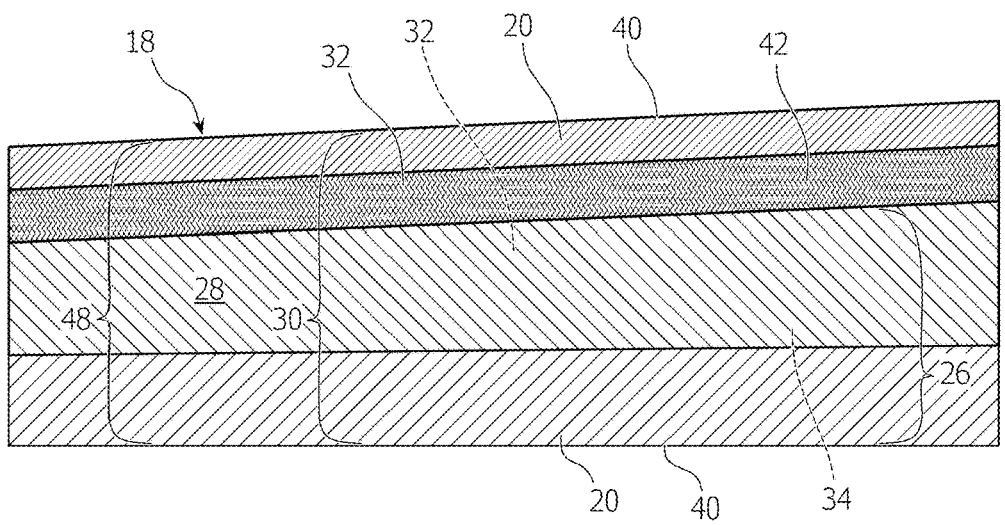
FIG. 4 is a photographic depiction of a top plan view of a transverse edge of an exemplary conductive multi-component composite structure showing an exemplary combination of laminate layers, including a co-cured, compressed conductive gasket layer overlayed along the transverse edge.

FIG. 4 is yet another photographic depiction. It is a top plan view of a transverse edge 48 of an exemplary conductive multi-component composite structure 18 showing an exemplary combination of laminate layers, including a co-cured, compressed infused metal gasket 26 overlayed along the transverse edge 48 forming an interface surface 28.

The representative composite structure 18 depicted comprises a transversely disposed co-cured metal-mesh gasket 26 overlayed upon the transverse edge 48 of the vertically disposed composite layers comprising inside and outside wall surface layers 40, a copper wire mesh layer 32, and other layers 34 (the other layers 34, shown having a phantom lead line to indicate being beneath a visually obscuring structure, and a portion of the copper wire mesh layer 32 are not visible because they are obscured by the overlaying co-cured metal-mesh gasket 26). Again, of course, the number of layers, the types of layers, the conductivity of the layers, the juxtaposition of various layers, and the various other composite variables and considerations may be altered and adjusted to create a composite structure 18 with various desired attributes to meet the desired needs for the composite structure 18.

Figure 5:
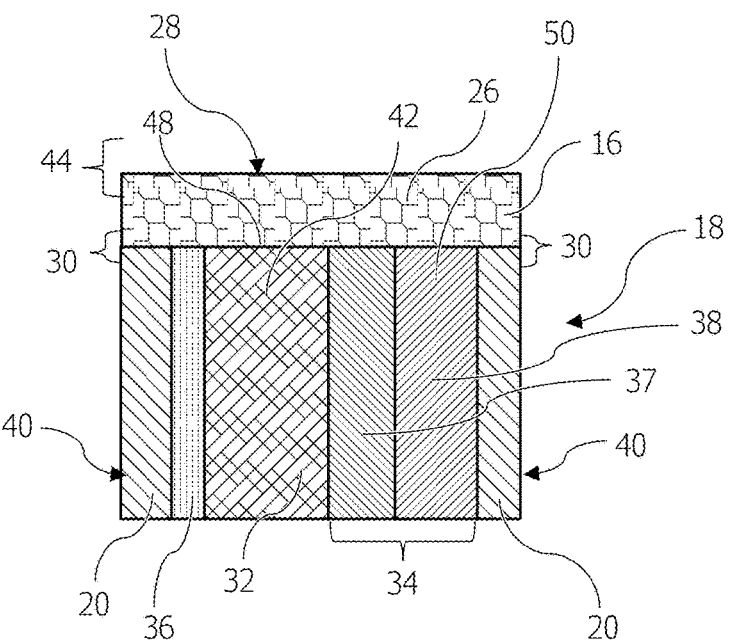
FIG. 5 is a vertical section of an upper portion of an exemplary conductive multi-component composite structure showing an exemplary combination of laminate layers and a co-cured, compressed conductive gasket layer overlayed along the upper transverse edge of the structure to form a conductive interface surface.

A representative exemplary composite structure 18 having a co-cured conductive metal-mesh gasket 26 overlayed upon and co-cured upon the transverse edge 48 of the vertically disposed composite layers of the composite structure 18 is shown in FIG. 5. With this composite structure 18, a co-cured region 30 comprising a portion of the conductive metal-mesh gasket 26 and a top portion of each of the conductive composite layers define and create at least a portion of a robust, highly conductive interface region 44 having a highly conductive interface surface 28 that is corrosion resistant and corrosion protective to any metal wire mesh layer 42, particularly the copper wire mesh layer 32. This is a principal aspect that has not heretofore been known or achieved.

The other or additional layers 34 that may be used in the laminate composite structure 18 may be a light-weight conductive layer 37 such as a metal-coated carbon fiber composite layer 36 and/or may be a light-weight structural layer 50 that may be conductive or not conductive and/or any other layer or layers 34. Those skilled in the art of composite laminates know of many potential combinations of other or additional layers 34 that may be used to achieve other attributes in the composite structure 18.

FIG. 6 is an alternative exemplary conductive composite structure 18 showing an exemplary combination of laminate layers (the portion to the left of Arrow A-A is a cutaway on a diagonal section taper to reveal the layers of the multi-component composite) and includes a co-cured, compressed conductive infused metal gasket 26 and an additional metal-mesh gasket 52 connected to the interface surface 28 of the co-cured, compressed conductive infused metal gasket 26 by a suitable connection. Such connection may be accomplished by adhesive bonding, tacking, spot adhesive bonding, co-curing with the other laminate layers, or any other suitable connection.

With the laminate construction shown in FIG. 6, the additional metal-mesh gasket 52 (such as a strip gasket) may be dry (as shown in FIG. 1, a dry metal-mesh gasket 12) and extend along an edge of an interface surface 28 and attached by adhesive or other suitable bonding, or the additional metal-mesh gasket 52 also may be co-cured with the laminate. This type of construction may be used where the interface surface 28 along the edge may be adequate to accomplish the desired conductivity within the interface region 44.

The diagonal section taper portion of the multi-component composite to the left of Arrow A-A reveals an exemplary composite structure 18 comprising a transversely disposed co-cured metal-mesh gasket 26 overlayed upon the transverse edge 48 of the vertically disposed composite layers comprising inside and outside wall surface layers 40, a copper wire mesh layer 32, and other layers 34 (the other layers 34, for example, may comprise a metal-coated carbon fiber composite layer or lightweight conductive layer 36 and a structural layer 38, as shown). Again, of course, the number of layers, the types of layers, the conductivity of the layers, the juxtaposition of various layers, and the various other composite variables and considerations may be altered and adjusted to create a composite structure 18 with various desired attributes to meet the desired needs for the composite structure 18.

The representative exemplary composite structure 18 having a co-cured conductive metal-mesh gasket 26 overlayed upon and co-cured upon the transverse edge 48 of the vertically disposed composite layers of the composite structure 18 as shown in FIG. 6, has a co-cured region 30 comprising a portion of the conductive metal-mesh gasket 26 and a top portion of each of the conductive composite layers define and create at least a portion of a robust, highly conductive interface region 44 having a highly conductive interface surface 28 that is corrosion resistant and corrosion protective to any metal wire mesh layer 42, particularly the copper wire mesh layer 32. This is a principal aspect that has not heretofore been known or achieved.

FIG. 7 is a side, exploded view of a portion of an exemplary interface region 44 between an upper component 54 and a lower component 56 (such as a lid and an enclosure) showing an infused metal-mesh gasket 16 co-cured on transverse edges (faces) 48 of the upper and lower components 54, 56 of representative composite structures 18. The positions of the upper and lower components 54, 56 are shown prior to or after the upper and lower components 54, 56 are brought into or out of abutting engagement with each other. The respective interface surfaces 28 are non-planar having complementary mating contours. Complementary mating contours, when in abutting mated engagement, create a contact interface and provide enhanced conductivity to eliminate or drastically reduce electromagnetic shielding leakage within the interface region 44.

FIG. 8 is a sectional, exploded view of a portion of another exemplary interface region 44 between an upper component 54 and a lower component 56 showing an ablated, infused metal gasket 26 co-cured on each transverse edge 48 of the upper and lower components 54, 56 of another representative combination composite structure 58. Again, the positions of the upper and lower components 54, 56 are shown prior to or after the upper and lower components 54, 56 are brought into or out of abutting engagement. The interface surface 28 of each of the upper and lower components 54, 56 within this alternative interface region 44 is a non-planar roughed surface 60. It should be understood, the non-planar roughed surface 60 shown is exaggerated for illustration purposes. Actual roughing will likely be considerably less pronounced.

The roughing of interface surfaces 28 may be achieved by scuffing off some or all excess resin 14 along the interface surface 28 after curing the resin 14. This also may be done using any of several known ablation processes or techniques such as light sanding, scraping, sand blasting, chemical etching, laser ablation or any other technique that removes excess resin 14 at the interface surface 28. By roughing the interface surfaces 28, many metal threads 62 (best seen in FIG. 2) of the metal mesh (best seen in the dry metal-mesh gasket 12 of FIG. 1) of the conductive, infused metal gasket 26 may be exposed. When each of the opposing interface surfaces 28 are brought together, many metal thread-to-metal thread contact points (not shown) will be created, thereby enhancing conductivity between the upper and lower components 54, 56.

FIG. 9 is a sectional end view of yet another alternative exemplary conductive composite structure 18 showing an exemplary combination of laminate layers disposed vertically, including an overlayed and co-cured, conductive, infused metal-mesh gasket 26 where the co-cured, infused metal-mesh gasket 26 is less than fully compressed, and a resilient resin 64 is used in curing to give the interface surface 28 a somewhat compressible, resilient interface surface 28. The exemplary conductive composite structure 18 comprises an exemplary combination of laminate layers, including wall surface layers 40, a metal wire mesh layer 42 (such as a copper wire mesh layer 32), three additional layers 34 that each may be any type of layer that conveys a desired physical attribute (such as, for example as shown, metal-coated carbon fiber composite layer 36, a light-weight conductive layer 37 and a light-weight structural layer 38). These additional layers 34, if any, may be selected by number of layers, juxtaposition of layers, and type of layers to provide specific attributes to the overall conductive composite structure 18, and as discussed above, those skilled in the art of composite laminates know of many combinations of other layers 34 that may be used to achieve other desired attributes. One or more of these other layers 34 may be conductive or not conductive. This alternative embodiment depicts a conductive composite structure 18 where the conductive infused metal gasket 26, the metal wire mesh layer 32, and any additional layers 34 are combined into a composite layup that is co-cured.

The co-cured, conductive, infused metal-mesh gasket 26 shown in FIG. 9 is attached to the transverse edge 48 of the combination of vertically disposed laminate layers. As depicted, the infused metal-mesh gasket 26 is less than fully compressed, thereby leaving an interior void 66 that facilitates a degree of resiliency in the infused metal-mesh gasket 26. To introduce a resilient interface surface 28 on the conductive composite structure 18, a resilient resin 64 may be infused into the metal mesh of the metal-mesh gasket 26 and the internal void 66, thereby filling the interstices of the metal mesh and the internal void 66. Then, by co-curing the resilient resin 64, the interface surface 28 may be somewhat compressible, creating resilient interface surface(s) 28 while maintaining conductivity.

Manufacturing expediency is achieved by the present invention. By co-curing an infused metal-mesh gasket 16 together with a composite layup, not only is the highly conductive interface surface 28 achieved but it combines the securement of the infused metal-mesh gasket 16 with a simple manufacturing step that is already being performed in creating the laminate. The only real difference is that the step is altered by adding the compressed infused metal-mesh gasket 16 to the transverse edge 48 of the combination of vertically disposed laminate layup prior to curing so that the compressed infused metal-mesh gasket 16 is co-cured with the other laminate layers 34. Significantly, this unique method creates a co-cured region 30 that eliminates gasket tear off or vulnerability issues, non-conductive resin face issues, and electromagnetic shielding leakage within the interface region 44. Additionally, the co-curing increases the strength of the bond and eliminates the need for an adhesive (whether the adhesive that would have been used otherwise is conductive or non-conductive) between the gasket and the transverse edge 48 or the flange face 24.

Those skilled in the art will appreciate that the present embodiments are exemplary and should not be limited to the embodiments shown and described.

The present invention may be embodied in other specific forms without departing from its structures, methods, or other essential characteristics as broadly described herein and claimed hereinafter. The described embodiments are to be considered in all respects only as illustrative, and not restrictive. The scope of the invention will, therefore, be indicated by the ultimate claims, rather than by the foregoing description. All changes that come within the meaning and range of equivalency of the claims are to be embraced within their scope.

What is claimed is:

1. A conductive composite structure comprising:
a plurality of layers bound together as a laminate by curing a resin, the laminate comprising:
a composite layer infused with the resin; and
a conductive gasket layer infused with the resin, wherein at least a portion of the resin infused into the conductive gasket layer is directly connected to the composite layer as part of the plurality of layers to define a conductive interface region having a conductive interface surface, wherein the conductive gasket layer comprises a metal mesh layer partially infused with resin such that the partially infused metal mesh layer is somewhat compressible at the conductive interface surface.

2. The conductive composite structure of claim 1, wherein the plurality of layers further comprises a metal wire mesh layer.

3. The conductive composite structure of claim 2, wherein the metal wire mesh layer comprises a copper wire mesh.

4. The conductive composite structure of claim 1, wherein the conductive gasket layer comprises a braided metal mesh.

5. The conductive composite structure of claim 1, wherein the conductive gasket layer comprises a knitted metal mesh.

6. The conductive composite structure of claim 1, wherein the conductive gasket layer comprises a compressed metal-mesh gasket.

7. The conductive composite structure of claim 1, wherein the conductive interface surface is non-planar.

8. The conductive composite structure of claim 7, wherein the non-planar conductive interface surface is roughed to expose metal of the metal-mesh gasket to the interface surface.

9. The conductive composite structure of claim 1, wherein the resin is resilient, and the conductive interface surface is resilient.

10. The conductive composite structure of claim 1, further comprising a metal-mesh gasket attached to the conductive gasket layer of the plurality of layers.

11. A conductive composite structure comprising:
a first component structure having a first plurality of layers bound together as a first laminate by curing a first resin, the first laminate comprising:
a first composite layer infused with the first resin; and
a first conductive gasket layer infused with the first resin, wherein at least a portion of the first resin infused into the first conductive gasket layer is connected directly to the first composite layer as part of the first plurality of layers to define a first conductive interface region having a first conductive interface surface; and
a second component structure having a second plurality of layers bound together as a second laminate by curing a second resin, the second laminate comprising:
a second composite layer infused with the second resin; and
a second conductive gasket layer infused with the second resin, wherein at least a portion of the second resin infused into the second conductive gasket layer is connected directly to the second composite layer as part of the second plurality of layers to define a second conductive interface region having a second interface surface, wherein the first and second conductive gasket layers comprise metal mesh layers partially infused with resin such that these partially infused metal mesh layers are somewhat compressible at the first conductive interface surface and the second conductive interface surface.

12. The conductive composite structure of claim 11, wherein the first resin and the second resin have common composition.

13. The conductive composite structure of claim 11, wherein each of the first conductive interface surface and the second conductive interface surface is non-planar.

14. The conductive composite structure of claim 13, wherein each of the non-planar first conductive interface surface and the non-planar second conductive interface surface have complementary mating contours, such that when in abutting mated engagement an interface is created between the first component structure and the second component structure that eliminates or reduces electromagnetic shielding leakage at the interface.

15. The conductive composite structure of claim 13, wherein at least one of the first conductive interface surface and the second conductive interface surface is roughed to expose metal of the metal-mesh gasket to the interface surface.

16. A method for constructing a conductive composite structure of claim 1, the method comprising the steps of:
preparing a laminate layup wherein the composite layer has an outer flange face that is outermost to the laminate layup;
adding a compressed metal-mesh gasket to the outer flange face such that a surface of the metal-mesh gasket becomes outermost to the laminate layup;
infusing resin into the metal-mesh gasket and the composite layer;
co-curing the resin in the metal-mesh gasket and the composite layer to form a co-cured conductive gasket layer connected to the composite layer such that the conductive gasket layer has a conductive interface surface.

17. The method of constructing a conductive composite structure of claim 16, further comprising the step of roughing the conductive interface surface to expose at least a portion of the metal-mesh gasket.

* * * * *